(12) United States Patent
Hidaka

(10) Patent No.: US 9,008,702 B2
(45) Date of Patent: Apr. 14, 2015

(54) BASE STATION AND METHOD OF CONTROLLING THE SAME

(75) Inventor: Hiroyuki Hidaka, Kanagawa (JP)

(73) Assignee: KYOCERA Corporation, Kyoto (JP)

( * ) Notice: Subject to any disclaimer, the term of this patent is extended or adjusted under 35 U.S.C. 154(b) by 628 days.

(21) Appl. No.: 13/379,999

(22) PCT Filed: Jun. 25, 2010

(86) PCT No.: PCT/JP2010/004246
§ 371 (c)(1),
(2), (4) Date: Dec. 21, 2011

(87) PCT Pub. No.: WO2010/150556
PCT Pub. Date: Dec. 29, 2010

(65) Prior Publication Data
US 2012/0094646 A1    Apr. 19, 2012

(30) Foreign Application Priority Data

Jun. 26, 2009 (JP) ................................. 2009-151878
Aug. 27, 2009 (JP) ................................. 2009-196278

(51) Int. Cl.
*H04W 4/00*        (2009.01)
*H04W 72/08*      (2009.01)
(Continued)

(52) U.S. Cl.
CPC .......... *H04W 72/082* (2013.01); *H04W 72/042* (2013.01); *H04W 84/045* (2013.01)

(58) Field of Classification Search
USPC ............... 455/501, 507, 509, 418, 63.1, 63.3, 455/67.13, 561
See application file for complete search history.

(56) References Cited

U.S. PATENT DOCUMENTS 6,006,093 A    12/1999 Aalto et al.
8,055,213 B2 *  11/2011 Hui et al. ....................... 455/100
(Continued)

FOREIGN PATENT DOCUMENTS

JP    10-501393       2/1998
JP    2006-067447 A   3/2006
(Continued)

OTHER PUBLICATIONS

NTT Docomo, Inc.; NTT Docomo Press release material; "Development of a micro base station for a femtocell"; Jul. 10, 2007, with translation URL:http://www.nttdocomo.co.jp/info/news_release/page/070710_01.html.
(Continued)

*Primary Examiner* — Ajit Patel
(74) *Attorney, Agent, or Firm* — Studebaker & Brackett PC

(57) ABSTRACT

Provided is a base station capable of maintaining a communication quality of a communication terminal (mobile station) having registered its position with the base station itself, even if an operating frequency is changed. According to the present invention, the base station includes a transmission and reception unit 102 configured to transmit and receive signals at the operating frequency for communication with the communication terminal, a pilot beacon transmission unit 104 configured to transmit a pilot beacon to a communication terminal, in communication with another base station, at an operating frequency of the another base station in order to allow the communication terminal to detect the operating frequency of the base station itself, and a control unit 101, if changing the operating frequency of the transmission and reception unit 102, configured to control the pilot beacon transmission unit 104 to change the frequency of the pilot beacon to transmit therefrom to the operating frequency of the transmission and reception unit 103 before changed and transmit the pilot beacon at this frequency.

8 Claims, 10 Drawing Sheets

(51) Int. Cl.
*H04W 72/04* (2009.01)
*H04W 84/04* (2009.01)

(56) References Cited

U.S. PATENT DOCUMENTS

| | | | |
|---|---|---|---|
| 2006/0046748 A1 | 3/2006 | Shinozaki | |
| 2009/0233599 A1 | 9/2009 | Shinozaki | |
| 2010/0304680 A1* | 12/2010 | Kuffner et al. | 455/63.1 |
| 2013/0115986 A1* | 5/2013 | Mueck et al. | 455/501 |
| 2013/0122947 A1* | 5/2013 | Li et al. | 455/501 |

FOREIGN PATENT DOCUMENTS

| | | |
|---|---|---|
| JP | 2007-150476 A | 6/2007 |
| WO | 95/35007 A1 | 12/1995 |

OTHER PUBLICATIONS

International Search Report; PCT/JP2010/004246; Sep. 28, 2010.

* cited by examiner

BASE STATION AND METHOD OF CONTROLLING THE SAME

CROSS REFERENCE TO RELATED APPLICATIONS

This application claims priority to and the benefit of Japanese Patent Application No. 2009-151878 (filed on Jun. 26, 2009) and Japanese Patent Application No. 2009-196278 (filed on Aug. 27, 2009), the entire contents of which are incorporated herein by reference.

TECHNICAL FIELD

The present invention relates to base stations, and more specifically, to base stations connected to mobile communication networks and methods of controlling the base stations.

BACKGROUND ART

In late years, mobile communication devices, particularly mobile phones, have been rapidly widespread and service areas thereof cover most of Japan. Nonetheless, there still are areas, such as inside houses and buildings and at bad locations behind mountains or buildings, providing no service or unstable communication as unable to receive radio waves, or due to weak radio waves, from existing usual base stations (that is, radio base stations connected to the mobile communication networks via dedicated lines (referred to as macrocells, hereinafter). Moreover, in highly populated areas, such as urban areas, since a single macrocell accepts numerous mobile phones, it generates areas having troubles for connection despite sufficient radio wave strength and areas with slow communication speed.

In order to cover such areas with bad communication conditions, small base stations have been developed to cover small areas (approximately a few meters to a few tens of meters in radius) with small power output. Among such small base stations, one connected to the mobile communication network via a public communication line (a broadband network such as ADSL) widespread for domestic use is particularly referred to as a "femtocell" (see Non-Patent Document 1).

The femtocell can use the public line as a connection line to the mobile communication network and can be installed by users. Accordingly, a user can improve a communication area by installing the femtocell in a place where the user wishes to use his/her mobile phone, even if it is inside a house or behind buildings where the radio wave environment is not good. In addition, the femtocell allows for establishment of a spot communication area in a macrocell service area in an urban area. Thus, if a user wishes to improve the communication speed, he/she can install the femtocell and enjoy the same services (voice call, email, SMS (Short Message Service), Internet browsing and the like) as a conventional macrocell at an even faster communication speed. This offers a great advantage for carriers as well. That is, since the users voluntarily use the femtocells and the public line, it saves resources (such as radio bands and fixed networks) of the macrocell, which are supposed to be consumed originally. As a result, the carriers can improve the service area of the mobile phones at low cost.

PRIOR ART DOCUMENT

Non-Patent Document

Non-Patent Document 1: "Development of a micro base station for a femtocell" by NTT DOCOMO, INC., [online], Jul. 10, 2007, (searched on Jun. 22, 2009), a website (URL: http://www.nttdocomo.co.jp/info/news_release/page/070710_01.html)

SUMMARY OF INVENTION

Technical Problem

As such, it is expected that, in 3 Generation (3 G), 3.9 Generation (3.9 G) and IMT-ADVANCED using a band of 2 GHz or higher, it would become essential to combine the macrocell installed outdoors and the femtocell installed indoors.

Meanwhile, a new communication trouble has been emerged due to optional installation of the femtocells by the users. In installation of the macrocell, the carriers usually inspect a possibility of interference with another macrocell and a communication area to be established. However, since the femtocells can be optionally installed by the users, such inspection of possible influence on (interference with) other base stations (femtocells and macrocells) cannot be conducted unlike installation of the macrocells. As a result, an optionally installed femtocell may raise a problem to interfere with the radio waves from a peripheral femtocell or macrocell.

In order to avoid such interference with the radio waves, in a femtocell system constituted of the femtocell and a management server configured to control the femtocell, the management server controls an operating frequency of the femtocell and instructs the femtocell about a suitable frequency. In addition, each femtocell measures radio wave conditions of the terminal itself and its periphery and reports a result to the management server. Based on current radio wave conditions reported from each femtocell, the management server determines suitable operating frequency for the femtocell, thereby avoiding interference with the radio waves of nearby femtocells.

In order to avoid interference with the radio waves, the femtocell operates as follows, in practice. Instructed to change the operating frequency, the femtocell first stops transmission of the radio waves, in order to change the operating frequency. Then, the femtocell changes the operating frequency as instructed and resumes transmission of the radio waves. At this time, a mobile station having registered its position with the femtocell operates as follows. When the femtocell stops transmission of the radio waves, the mobile station has no service and thus starts searching a connectable system. When finding a macrocell, the mobile station registers its position therewith to shift into a standby state with the macrocell. Then, after the femtocell completes change of the operating frequency and resumes transmission of the radio waves, the mobile station receives a false standby signal (pilot beacon) transmitted from the femtocell and connects to the femtocell again.

Change of the operating frequency of the femtocell in the above manner leads to a problem as follows. For example, when the femtocell is used in an office, a few tens or more of communication terminals may have registered their positions with the femtocell. If the femtocell changes the operating frequency under such a condition, these communication terminals temporarily lose connection to the femtocell because of such change and thus change their connections to the macrocell. Due to simultaneous access to the macrocell from the communication terminals having registered their positions with the femtocell, reception interference increases.

Accordingly, it has been anticipated not only deterioration in a communication quality but also disconnection of the communication.

The present invention, in consideration of the above problems, suggests a base station capable of maintaining the communication quality of the communication terminal (mobile terminal) registered its position with the base station itself even if the base station changes the operating frequency.

Solution to Problem

In order to solve the above problem, a base station according to the present invention controls: a transmission and reception unit configured to transmit and receive a radio signal at an operating frequency for communication with a communication terminal connected to the base station itself; a pilot beacon transmission unit configured to transmit a pilot beacon including an instruction for the communication terminal to detect the operating frequency of the base station itself; and transmission of the pilot beacon, if changing the operating frequency of the transmission and reception unit, in order to prevent the communication terminal connected to the base station itself from connecting to another base station.

The control unit of the base station according to the present invention, if changing the operating frequency of the transmission and reception unit, controls the pilot beacon transmission unit to change a frequency of the pilot beacon to the operating frequency of the transmission and reception unit before changed.

The control unit of the base station according to the present invention, if changing the operating frequency of the transmission and reception unit and there is the communication terminal in communication at the operating frequency of the transmission and reception unit, controls the transmission and reception unit to change the operating frequency of the transmission and reception unit after changing the operating frequency of the communication terminal in communication.

The control unit of the base station according to the present invention, after a predetermined period after changing the frequency of the pilot beacon, controls the pilot beacon transmission unit to change the frequency of the pilot beacon to an operating frequency used by another base station.

The control unit of the base station according to the present invention, if changing the operating frequency of the transmission and reception unit, controls the pilot beacon transmission unit to change the frequency of the pilot beacon to the operating frequency changed and controls the transmission and reception unit, without including the instruction in the pilot beacon, to transmit the radio signal including the instruction at the operating frequency before changed.

The control unit of the base station according to the present invention, if changing the operating frequency of the transmission and reception unit and there is a communication terminal in communication at the operating frequency of the transmission and reception unit, controls the transmission and reception unit to change the operating frequency of the transmission and reception unit after making the communication terminal in communication change its operating frequency.

The control unit of the base station according to the present invention, when the operating frequency of the transmission and reception unit is changed, controls the pilot beacon transmission unit to change the frequency of the pilot beacon to the operating frequency used by another base station and transmit the pilot beacon including the instruction.

According to the present invention, a method of controlling a base station having a transmission and reception unit configured to transmit and receive a radio signal at an operating frequency for communication with a communication terminal and a pilot beacon transmission unit configured to transmit a pilot beacon including an instruction for the communication terminal to detect the operating frequency of the base station itself, includes: if changing the operating frequency of the transmission and reception unit, changing a frequency of the pilot beacon transmitted from the pilot beacon transmission unit, in order to prevent the communication terminal connected to the base station itself from connecting to another base station; and controlling the pilot beacon transmission unit to transmit the pilot beacon at the frequency changed.

Effect of the Invention

According to the present invention, it is possible to provide the base station capable of maintaining a communication quality of the communication terminal (mobile station) having registered its position with the base station itself even if the operating frequency of the base station itself is changed.

DESCRIPTION OF EMBODIMENTS

Figure 1:
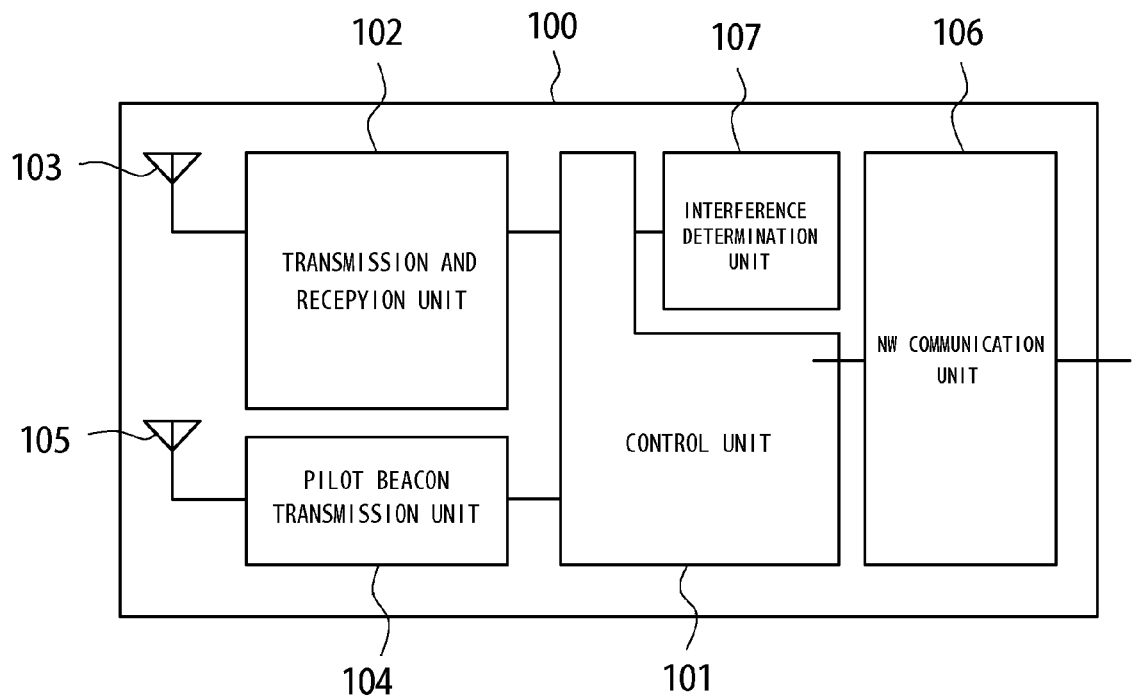
FIG. 1 is a schematic block diagram illustrating a base station (femtocell) of a mobile communication system according to an embodiment of the present invention.

Embodiments of the present invention will be described with reference to the accompanying drawings. FIG. 1 is a schematic block diagram illustrating a femtocell base station (femtocell 100) of a mobile communication system according to the embodiments. Here, CDMA1000 1xEV-DO, W-CDMA (HSDPA and the like), LTE and the like are applicable as the mobile communication system according to the present invention.

As shown in FIG. 1, the femtocell 100 has a control unit 101, a transmission and reception unit 102, a transmission and reception antenna 103, a pilot beacon transmission unit 104, a pilot beacon transmission antenna 105, a NW communication unit 106 and an interference determination unit 107.

The transmission and reception unit 102, via the transmission and reception antenna 103, transmits and receives signals at an operating frequency for communication with a communication terminal. The operating frequency may be, for example, a frequency of a carrier (Carrier) configured to transmit modulated voice signals, data signals and the like.

The pilot beacon transmission unit 104 transmits a pilot beacon, which is a radio signal, via the pilot beacon transmission antenna 105. The pilot beacon usually uses an operating frequency of a macrocell base station (macrocell) having a communication area overlapping that of the femtocell. The pilot beacon includes an instruction to shift (redirect) to the operating frequency of the femtocell itself (that is, to make the communication terminal detect the operating frequency of the femtocell itself). Upon capturing the pilot beacon, the communication terminal shifts (redirects) to the operating frequency of the femtocell and detects (captures) the operating frequency of the femtocell.

The NW communication unit 106 is connected to a public line (broadband network such as ADSL) via a router or the like to communicate with the carrier and a management server equipped within a network of the carrier.

Based on a result of monitoring communication states of the femtocell itself and peripheral base stations, the interference determination unit 107 determines whether radio waves are interfered. A result of determination by the interference determination unit 107 is transmitted to the management server via the NW communication unit 106. The management server determines a frequency to avoid interference based on the result transmitted from the femtocell and generates an instruction for the femtocell 100 to change the operating frequency.

The control unit 101 can control the transmission and reception unit 102, the transmission and reception antenna 103, the pilot beacon transmission unit 104, the pilot beacon transmission antenna 105, the NW communication unit 106 and the interference determination unit 107. Especially when changing the operating frequency of the transmission and reception unit 102, the control unit 101 controls the pilot beacon transmission unit 104 to prevent the communication terminal connected to the femtocell itself (having registered its position with the femtocell itself) from connecting to another base station.

Figure 2:
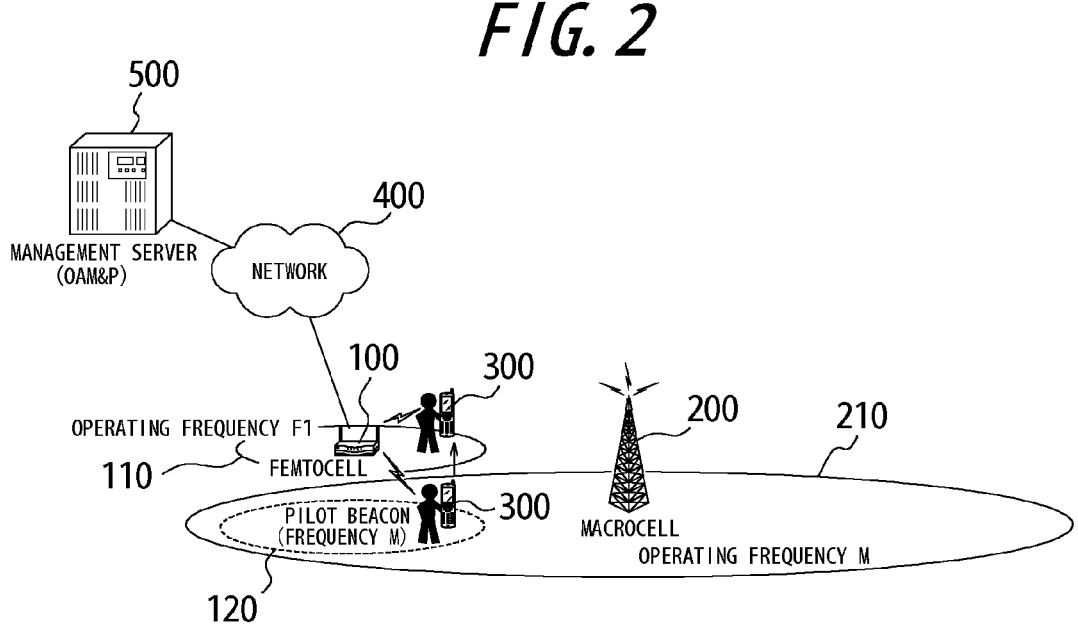
FIG. 2 is a schematic configuration diagram illustrating the mobile communication system including the femtocell and a macrocell.

Next, an operation of the femtocell is described with reference FIG. 2. FIG. 2 is a schematic configuration diagram illustrating the mobile communication system including the femtocell 100 and a macrocell 200. A macrocell 200 is connected to the mobile communication network via a dedicated line. The macrocell 200 can communicate in an area 210, which is relatively large. In contrast, the femtocell 100, connected to a network 400 including the mobile communication network via the public line such as the broadband network or the like, can communicate only within an area 110, which is relatively small. The femtocell 100 uses an operating frequency F1, different from an operating frequency M of the macrocell 200, in order to avoid interfering with the macrocell 200. In addition, the femtocell 100 transmits the pilot beacon at the operating frequency M of the macrocell 200.

This pilot beacon is a simulant of a standby signal of the base station. When a communication terminal 300 connected to (having registered its position with) the macrocell 200 with the operating frequency M approaches the femtocell 100, an electric intensity of the radio wave of the pilot beacon received from the femtocell 100 becomes higher than the electric intensity of the radio wave of the standby signal received from the macrocell 200. Accordingly, the communication terminal 200 captures the pilot beacon from the femtocell 100. Since the pilot beacon includes an instruction to shift (redirect) to the operating frequency F1 of the femtocell 100, the communication terminal 300 having captured the pilot beacon shifts to the operating frequency F1 of the femtocell 100 and detects (captures) the operating frequency F1.

In addition, the femtocell 100 is connected to a management server 500 via the network 400. The management server 500 centrally controls the femtocell 100 and, based on interference between the femtocells, issues the instruction for the femtocell 100 to change the operating frequency.

In FIG. 2, the area 110 and the area 120 are shown one above the other for the sake of expedience, in order to show that they use different frequencies. That is, the area 110 allows for communication at the operating frequency F1, whereas the area 120 allows for transmission of the pilot beacon at the operating frequency M of the macrocell 200.

In the following embodiments, it is assumed that the femtocell 100 uses a plurality of band classes in 2 GHz, for example, and that the operating frequencies F1, F2 used by the transmission and reception unit 102 of the femtocell 100 are in different band classes. According to the embodiments of the present invention, the frequency of the pilot beacon corresponds to a control channel in those band classes.

First Embodiment

Figure 3:
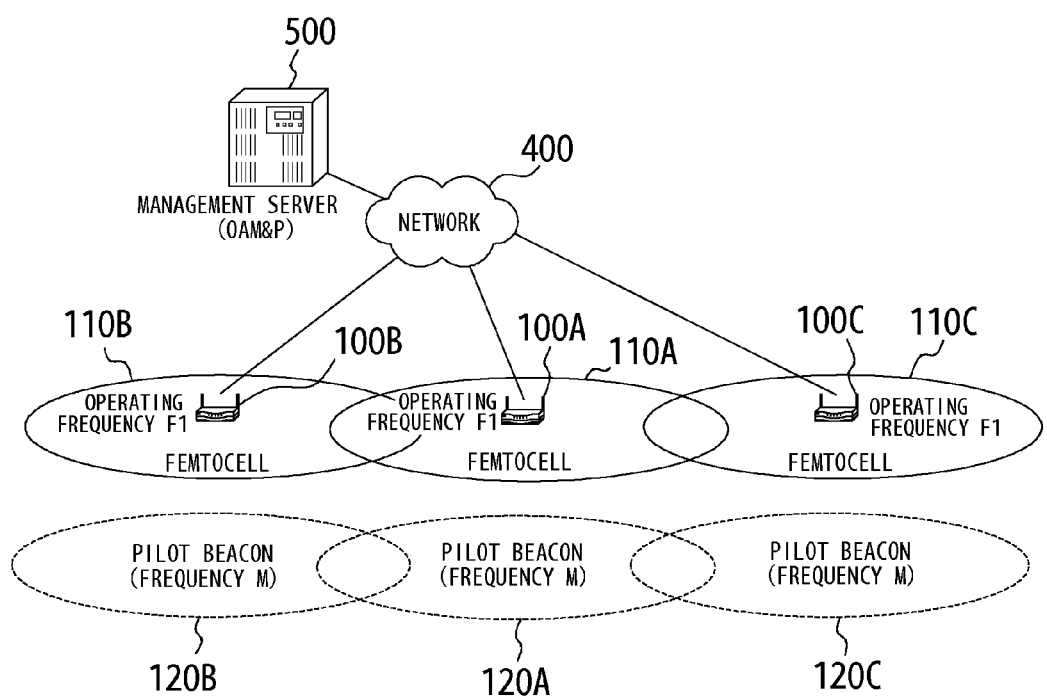
FIG. 3 is a diagram illustrating a state in which radio waves are interfered by the femtocell closely installed.

Next, a change of the operating frequency of the femtocell is described according to a first embodiment of the present invention. FIG. 3 is a diagram illustrating a state in which the radio waves are interfered by the femtocell closely installed. The femtocell 100 may be installed at any position connectable to the public line such as the broadband network. As shown in FIG. 3, accordingly, if femtocells 100A, 100B and 100C are installed close to one another, communication available areas 110A, 110B and 110C overlap one another, which is likely to cause interference with the radio waves.

Figure 4:
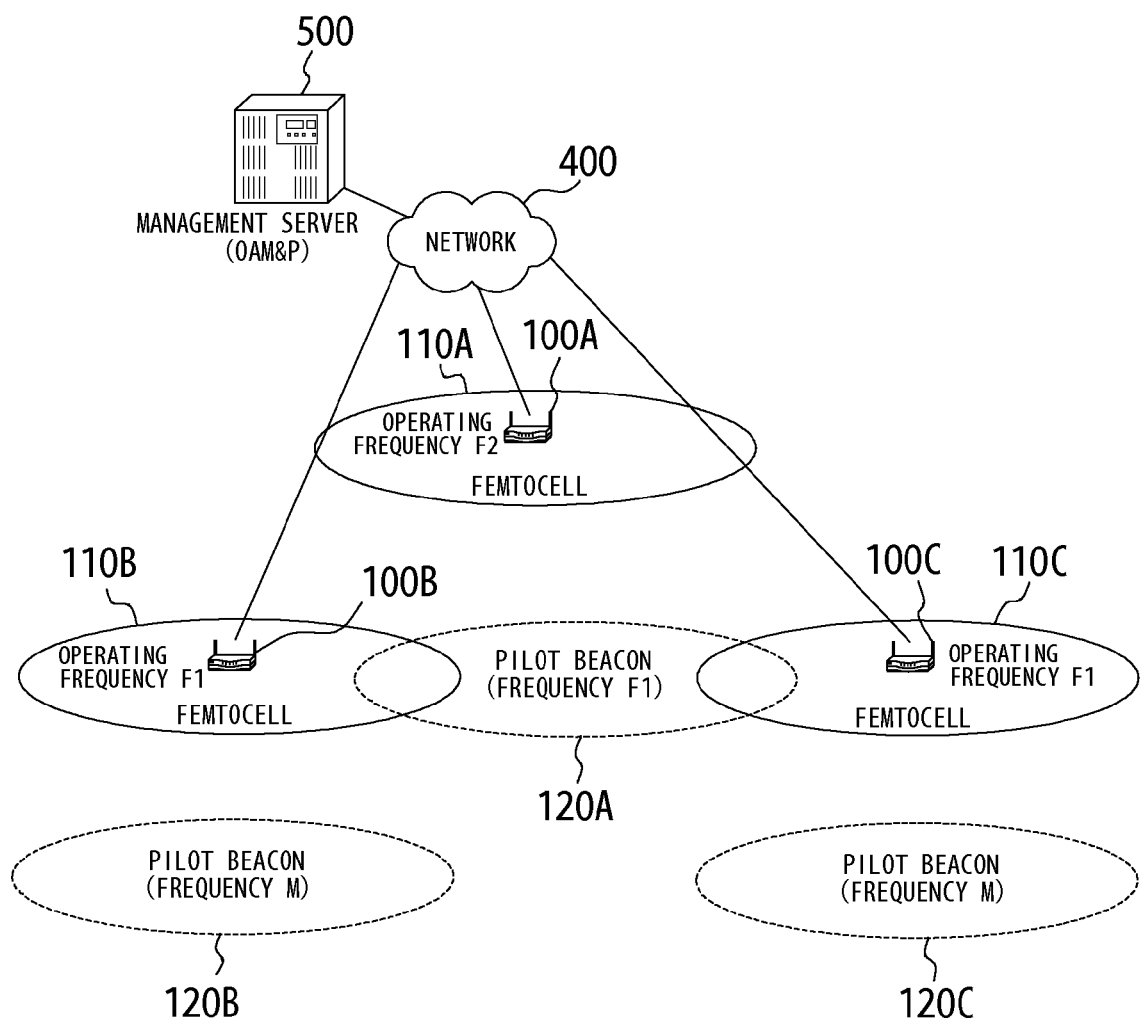
FIG. 4 is a diagram illustrating a state in which an operating frequency of the femtocell and a frequency of a pilot beacon are changed.

Next, FIG. 4 is a diagram illustrating a state in which the operating frequency of the femtocell and the frequency of the pilot beacon are changed. If it is determined by the interference determination unit 107 of the femtocell 100A that the radio wave is interfered, due to installation of the femtocell 100 at a position where it is likely to interfere the radio wave as shown in FIG. 3, the femtocell 100A reports accordingly to the management server 500. Based on the report from the femtocell 100 located nearby, the management server 500 determines the operating frequency F2 to avoid interference and informs the femtocell 100A of it. Following the instruction by the management server 500, the femtocell 100A changes the operating frequency F1 of the transmission and reception unit 102 to the operating frequency F2, as well as changing the frequency of the pilot beacon to be transmitted by the pilot beacon transmission unit 104 from the operating frequency M to the operating frequency F1. Changing the operating frequency to the operating frequency F2 as described above, the femtocell 100A can use an operating frequency different from that of the femtocells 100B, 100C located nearby, thus can reduce influence by interference of the radio waves. In addition, the femtocell 100A changes the frequency of the pilot beacon to the operating frequency F1. Thereby, the femtocell 100A can transmit the pilot beacon at the operating frequency F1 to a communication terminal (not shown) connected to (having registered its position with) the femtocell 100A itself, such that the communication terminal detects (captures) the operating frequency F2 after change of the operating frequency.

Now, it is assumed that the femtocell 100A does not change the frequency of the pilot beacon to the operating frequency F1 but continues to transmit the radio waves at the operating frequency M to the communication terminal 300 connected to the femtocell 100A itself at the operating frequency F1. In this case, if the femtocell 100A changes the operating frequency to the operating frequency F2, there is no radio wave transmitted at the operating frequency F1 from the femtocell 100A and thus the communication terminal 300 would lose the femtocell A. Having lost the femtocell 100A, the communication terminal 300 starts searching a base station and, if finds the macrocell 200 (not shown), operates to register its position with the macrocell 200. If communicating at the operating frequency M of the macrocell after registering its position with the macrocell 200, the communication terminal 300 can capture the pilot beacon, as the frequency of the pilot beacon transmitted from the femtocell 100A is also the operating frequency M. Since the pilot beacon includes the instruction to shift (redirect) to the operating frequency F2 of the femtocell 100A, the communication terminal 300 shifts to the operating frequency F2, detects the operating frequency F2 and then registers its position with the femtocell 100A.

If the frequency of the pilot beacon is not changed as described above, it has been necessary for the communication terminal 300, in order to communicate with the femtocell 100A after change of the operating frequency, to once shift to the macrocell 200 and capture the pilot beacon transmitted at the operating frequency M of the macrocell 200. According to the first embodiment of the present invention, however, the femtocell 100A, in changing its operating frequency, changes the frequency of the pilot beacon to the operating frequency F1 of the transmission and reception unit 102 before change of the operating frequency and transmits the pilot beacon at the operating frequency F1 to the communication terminal 300 having registered its position with the femtocell 100A. Thereby, the communication terminal 300 can directly connect to the femtocell 100A after change of the frequency.

Figure 5:
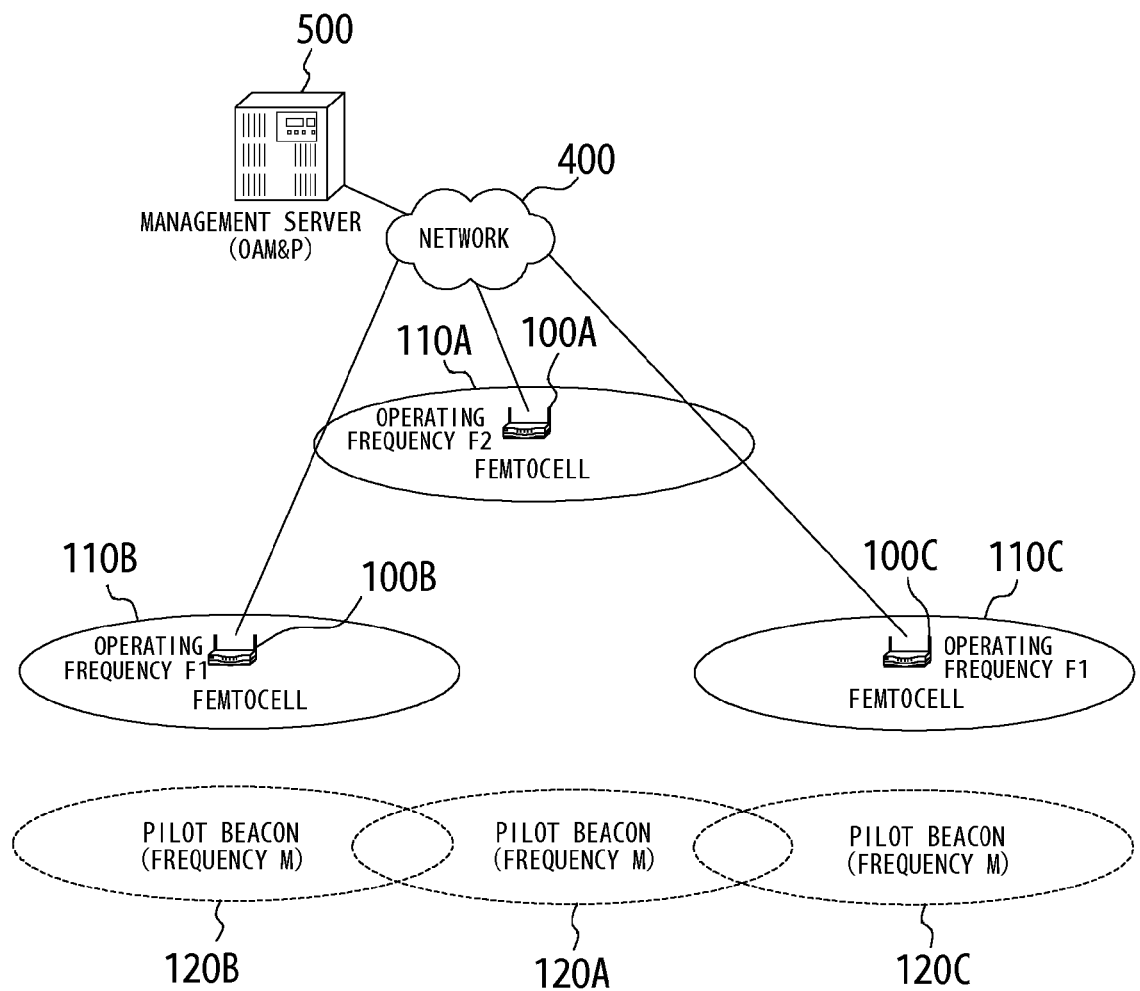
FIG. 5 is a diagram illustrating a state in which the frequency of the pilot beacon is changed to the operating frequency of the macrocell after the operating frequency of the femtocell and the frequency of the pilot beacon are changed.

Next, FIG. 5 is a diagram illustrating a state in which the frequency of the pilot beacon is changed to the operating frequency of the macrocell after the operating frequency of the femtocell and the frequency of the pilot beacon are changed. As shown in FIG. 4, the femtocell 100A, after changing the operating frequency thereof and the frequency of the pilot beacon, once again changes the frequency of the pilot beacon to return it from the operating frequency F1 to the operating frequency M, which is the same as the operating frequency of the macrocell. A timing to return the frequency of the pilot beacon to the operating frequency M may be after a predetermined period after change of the frequency of the pilot beacon to the operating frequency F1 or after change of the operating frequency of the communication terminal connected to the femtocell 100A before change of the operating frequency. Although the frequency of the pilot beacon is returned to the operating frequency M, it may be changed to an operating frequency M'. The operating frequency M' is any one of a plurality of frequencies used by the macrocell 200.

Figure 6:
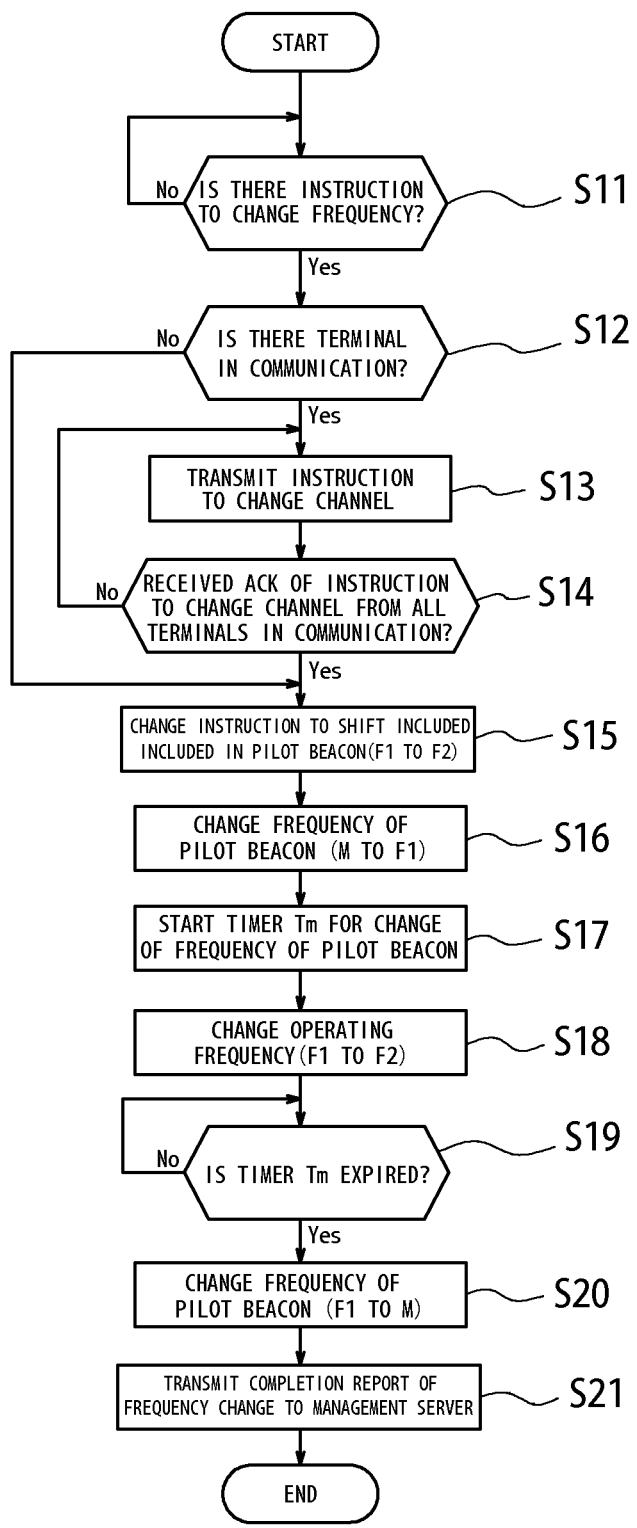
FIG. 6 is a flowchart illustrating an operation of the femtocell according to a first embodiment of the present invention.
Figure 7:
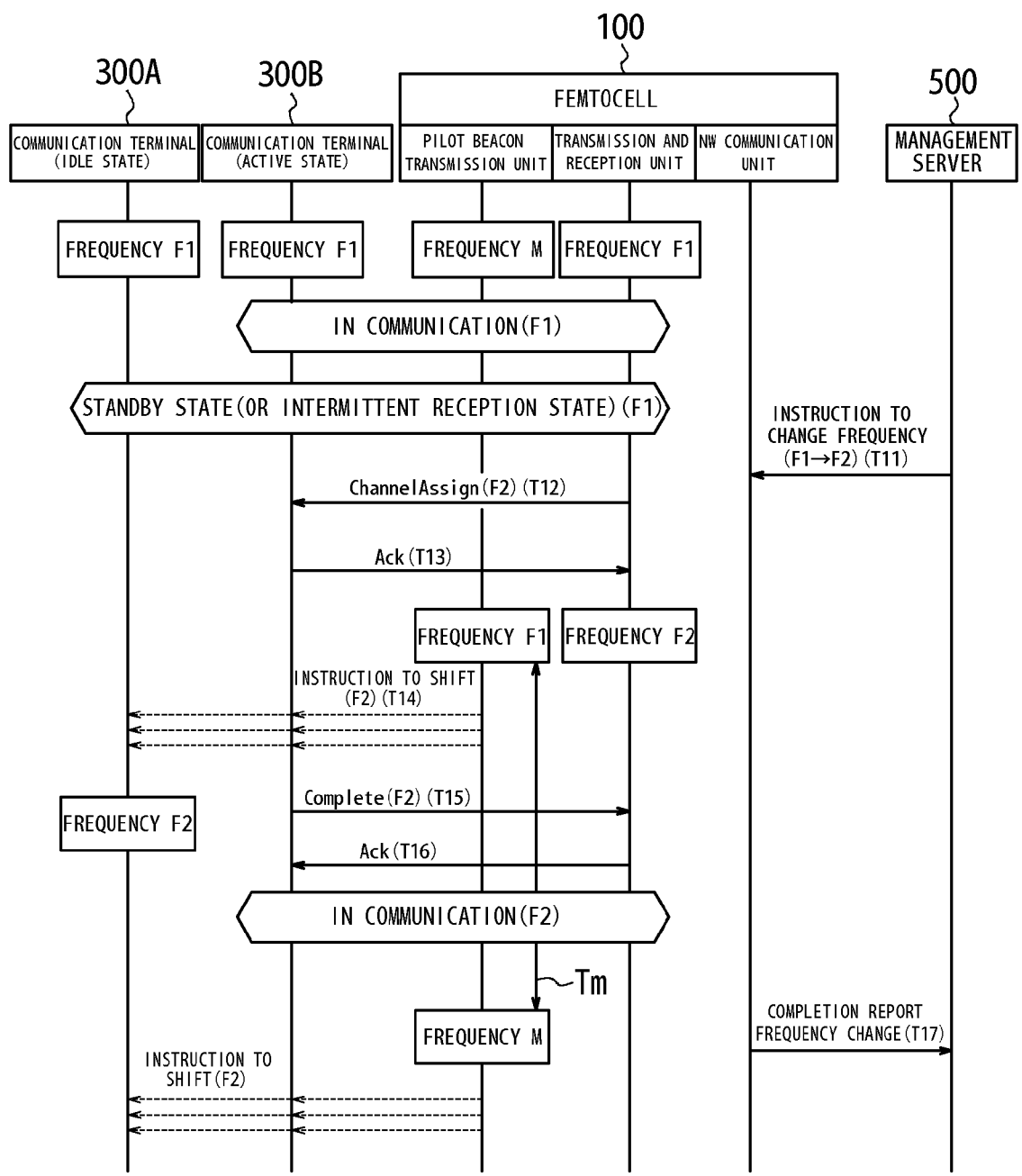
FIG. 7 is a sequence diagram of the communication terminal, the femtocell and a management server according to the first embodiment of the present invention.

Next, change of the operating frequency of the femtocell 100 according to the first embodiment of the present invention will be described with reference to a flowchart and a sequence diagram. FIG. 6 is a flowchart illustrating an operation of the femtocell 100 and FIG. 7 is a sequence diagram of communication terminals 300A, 3000B, the femtocell 100 and the management server 500.

The flowchart shown in FIG. 6 starts in a state that the femtocell 100 is connected to the network 400 and communicating (in an Active state (voice call or data communication) with the communication terminal 300 at the operating frequency F1, as well as transmitting the pilot beacon at the operating frequency M.

First, the interference determination unit 107 determines that the radio waves are interfered. The interference determination unit 107 reports a result of such determination to the management server 500 via the NW communication unit 106. The management server 500 determines to change the frequency based on the report and other reports from nearby femtocells and informs the femtocell 100 accordingly. The femtocell 100 determines whether there is an instruction to change the operating frequency of the transmission and reception unit 102 from the operating frequency F1 to the operating frequency F2 (step S11). If there is the instruction to change the operating frequency, the control unit 101 determines whether there is the communication terminal 300 in communication with the femtocell itself (step S12). If it is determined that there is the communication terminal 300 in communication with the femtocell itself, the control unit 101 controls the transmission and reception unit 102 to transmit a channel (frequency) change instruction (ChannelAssign) (step S13). The channel change instruction includes an instruction to change a communication channel at the operating frequency F2. If receiving an acknowledgment (Ack) of the channel change instruction from the communication terminal 300 in communication after transmission of the channel change instruction, the operation shifts to step S14. If the acknowledgment of the channel change instruction is not received from the communication terminal 300 in communication, the operation returns to step S13 such that the control unit 101 controls the transmission and reception unit 102 to continue transmission of the channel change instruction. When receiving the acknowledgments from all terminals in communication, the operation shifts to step S15.

Next, the control unit 101 changes setting of the instruction to shift (redirect) to include in the pilot beacon transmitted from the pilot beacon transmission unit 104 from the operating frequency F1 to the operating frequency F2 at step S15. This allows the communication terminal 100 receiving the pilot beacon to shift (redirect) to the operating frequency F2 and detect (capture) it. After changing the instruction, the control unit 101 changes the frequency of the pilot beacon transmitted from the pilot beacon transmission unit 104 from the operating frequency M of the macrocell to the operating frequency F1 of the transmission and reception unit 102 before change of the operating frequency, and transmits the pilot beacon at the operating frequency F1 from the pilot beacon transmission unit 104 (step S16). After changing the frequency of the pilot beacon, the control unit 101 starts a timer Tm corresponding to a period to transmit the pilot beacon at the operating frequency F1 (step S17).

Next, following the instruction to change the frequency at step S11, the control unit 101 changes the operating frequency F1 of the transmission and reception unit 102 to the operating frequency F2, and then the transmission and reception unit 102 starts transmission and reception of signals at the operating frequency F2 (step S18). Then, the control unit 101 determines whether the timer Tm set at step S17 is expired (step S19). When the timer Tm is expired, the control unit 101 changes the frequency of the pilot beacon from the operating frequency F1 to the operating frequency M of the macrocell and controls the pilot beacon transmission unit 104 to transmit the pilot beacon at the operating frequency M (step S20). After changing the frequency of the pilot beacon to the operating frequency M of the macrocell, the control unit 101 transmits a completion report of operating frequency change, which is information that change of the operating frequency of the femtocell 100 is completed, to the management server 500 via the NW communication unit 106 (step S21), and thus ends the operation.

Next, change of the operating frequency of the femtocell 100 will be described with reference to a sequence diagram. FIG. 7 is the sequence diagram of the communication terminals 300A, 300B, the femtocell 100 and the management server 500. The communication terminals 300A, 300B are connected to (having registered their positions with) the femtocell 100 at the operating frequency F1. While the communication terminal 300A is in a standby state or in an intermittent reception state (Idle state), the communication terminal 300B is in communication (in the Active state (in voice call or data communication)). The femtocell 100 transmits the pilot beacon, which includes the instruction to shift (redirect) to the operating frequency F1, at the operating frequency M of the macrocell 200.

Upon reception of the instruction to shift its operating frequency from the operating frequency F1 to the operating frequency F2 from the management server 500 (step T11), the femtocell 100 transmits ChannelAssign (channel (frequency) change instruction) to the communication terminal 300B in the Active state (step T12). The ChannelAssign includes an instruction to change to the communication channel at the operating frequency F2.

After step T12, the communication terminal 300B transmits Ack (an acknowledgment of the channel change instruction) to the femtocell 100 (step T13). After receiving the Ack from the communication terminal 300B, the femtocell 100 sets the frequency of the pilot beacon at the operating frequency F1 and changes the setting of the instruction to shift (redirect) to include in the pilot beacon from the operating frequency F1 to the operating frequency F2. In addition, in order to limit duration of transmission of the pilot beacon at the operating frequency F1, the femtocell 100 starts the timer Tm after changing the frequency of the pilot beacon. Further, in accordance with change of the frequency of the pilot beacon, the femtocell 100 changes the operating frequency to the operating frequency F2. When receiving the pilot beacon changed to the operating frequency F1, the communication terminal 300A in the Idle state shifts (redirects) to the operating frequency F2 following the instruction included in the pilot beacon. The communication terminal 300A detects (captures) the radio wave at the operating frequency F2 from the femtocell 100 and, based on the operating frequency F2, remains in the standby state or the intermittent reception state (Idle state) with the femtocell 100 (step T14). The communication terminal 300B in the Active state captures the communication channel at the operating frequency F2 specified by the ChannelAssign and then transmits Complete (a completion report of channel change) (step T15).

Upon reception of Complete transmitted from the communication terminal 300B, the femtocell 100 transmits Ack (an acknowledgment of completion of channel change) to the communication terminal 300B (step T16). If the timer Tm is expired when the frequency of the pilot beacon is changed, the femtocell 100 returns the frequency of the pilot beacon to the operating frequency M of the macrocell 200 and transmits the pilot beacon at the operating frequency M. After changing the frequency of the pilot beacon to the operating frequency M, the femtocell 100 transmits the completion report of operating frequency change, which is the information that change of the operating frequency of the femtocell 100 is completed, to the management server 500 (step T17), and thus ends the operation. In this way, the femtocell can change the operating frequency while maintaining communication states of the communication terminal 300A in the Idle state and the communication terminal 300B in the Active state.

Second Embodiment

Next, change of the operating frequency of the femtocell will be described according to the second embodiment of the present invention. FIG. 3 is the diagram illustrating the state in which the radio waves are interfered by the femtocell closely installed. The femtocell 100 may be installed at any position connectable to the public line such as the broadband network. As shown in FIG. 3, accordingly, if the femtocells 100A, 100B and 100C are installed close to one another, the communicable areas 110A, 110B and 110C thereof overlap one another, which is likely to cause interference with the radio waves.

Figure 8:
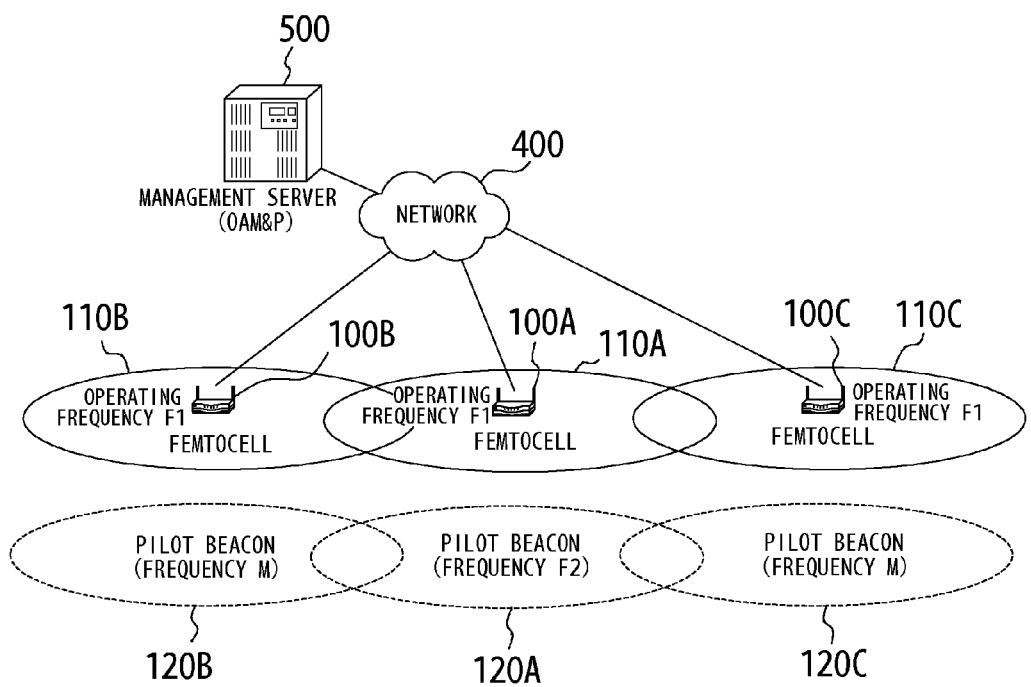
FIG. 8 is a diagram illustrating a state in which the frequency of the pilot beacon is changed according to a second embodiment of the present invention.

Next, FIG. 8 is a diagram illustrating a state in which the frequency of the pilot beacon is changed. If it is determined by the interference determination unit 107 of the femtocell 100A that the radio waves are interfered due to installation of the femtocell 100 at a position where it is likely to cause interference as shown in FIG. 3, the femtocell 100A reports interference to the management server 500. Based on the report from the femtocell 100 located nearby, the management server 500 determines the operating frequency F2 to avoid interference and informs the femtocell 100A of it. Upon reception of the instruction from the management server 500, the femtocell 100A first excludes the instruction to shift (redirect) to the operating frequency F1 from the pilot beacon. Then, the femtocell 100A changes the frequency of the pilot beacon transmitted from the pilot beacon transmission unit 104 from the operating frequency M to the operating frequency F2.

Next, the transmission and reception unit 102 of the femtocell 100A transmits the radio signal including the instruction to shift (redirect) to the operating frequency F2 to the communication terminal connected to the femtocell 100A at the operating frequency F1. Accordingly, the communication terminal changes its operating frequency from the operating frequency F1 to the operating frequency F2. At this time, since the pilot beacon has been already transmitted at the operating frequency F2, the communication terminal 300 having changed the operating frequency can receive it. Upon reception of the radio signal (pilot beacon) at the operating frequency F2, the communication terminal 300 decodes the radio signal (pilot beacon). The communication terminal 300 needs a certain processing time for it. According to the present embodiment, therefore, the operating frequency of the femtocell 100A is changed from the operating frequency F1 to the operating frequency F2 until decoding is completed. This prevents the communication terminal 300 from changing its connection from the femtocell 100A to the macrocell 200 as incapable of receiving the radio signal (pilot beacon) at the operating frequency F2 despite change of the operating frequency to the operating frequency F2 following the instruction.

Figure 9:
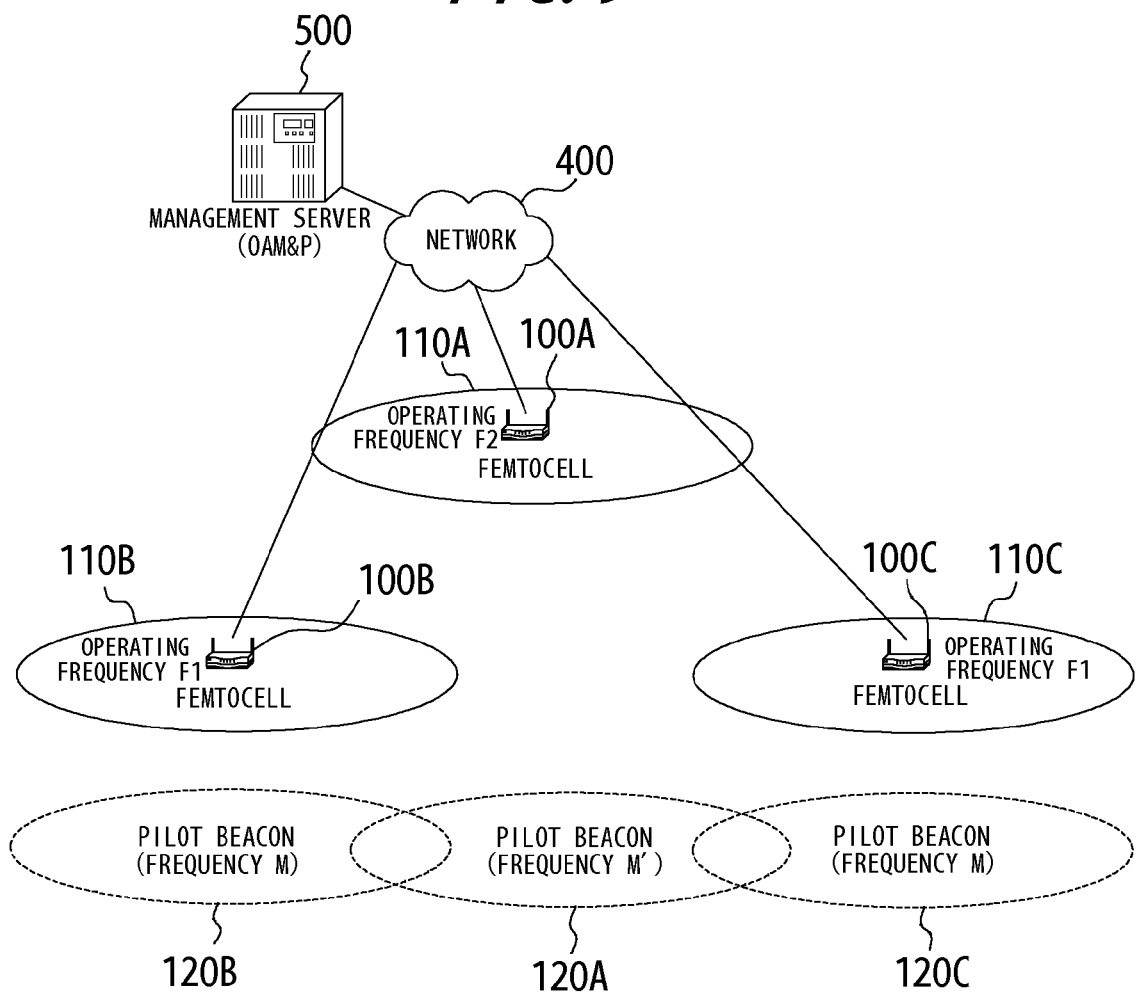
FIG. 9 is a diagram illustrating a state in which the operating frequency of the femtocell and the frequency of the pilot beacon are changed after the frequency of the pilot beacon is changed according to the second embodiment of the present invention.

FIG. 9 is a diagram illustrating a state in which the operating frequency of the femtocell and the frequency of the pilot beacon are changed after change of the frequency of the pilot beacon as shown in FIG. 8. If the frequency of the pilot beacon of the femtocell 100A is changed to the operating frequency F2 and the transmission and reception unit 102 transmits the radio signal including the instruction to shift (redirect) to the operating frequency F2 as shown in FIG. 8, the operating frequency used by the communication terminal 300 is changed from the operating frequency F1 to the operating frequency F2. Then, the femtocell 100A changes the operating frequency thereof to the operating frequency F2, controls to include the instruction to shift (redirect) to the operating frequency F2 in the pilot beacon, and changes the frequency of the pilot beacon including the instruction from the operating frequency F2 to the operating frequency M'. The operating frequency M' is any one of a plurality of frequencies used by the macrocell 200.

The frequency of the pilot beacon after change of the operating frequency may be the original operating frequency M or, as described above, the operating frequency M' used by the macrocell 200 or a nearby macrocell. If the frequency of the pilot beacon is the operating frequency M', the femtocell 100A includes the operating frequency M' in information on the nearby base station included in notification information, in order to shift the communication terminal in the standby state at the operating frequency M used by the macrocell 200 to the operating frequency M' used by the macrocell 200 or the nearby macrocell, for example. Alternatively, the communication terminal itself includes the operating frequency M' in a frequency search list of itself as its setting.

Figure 10:
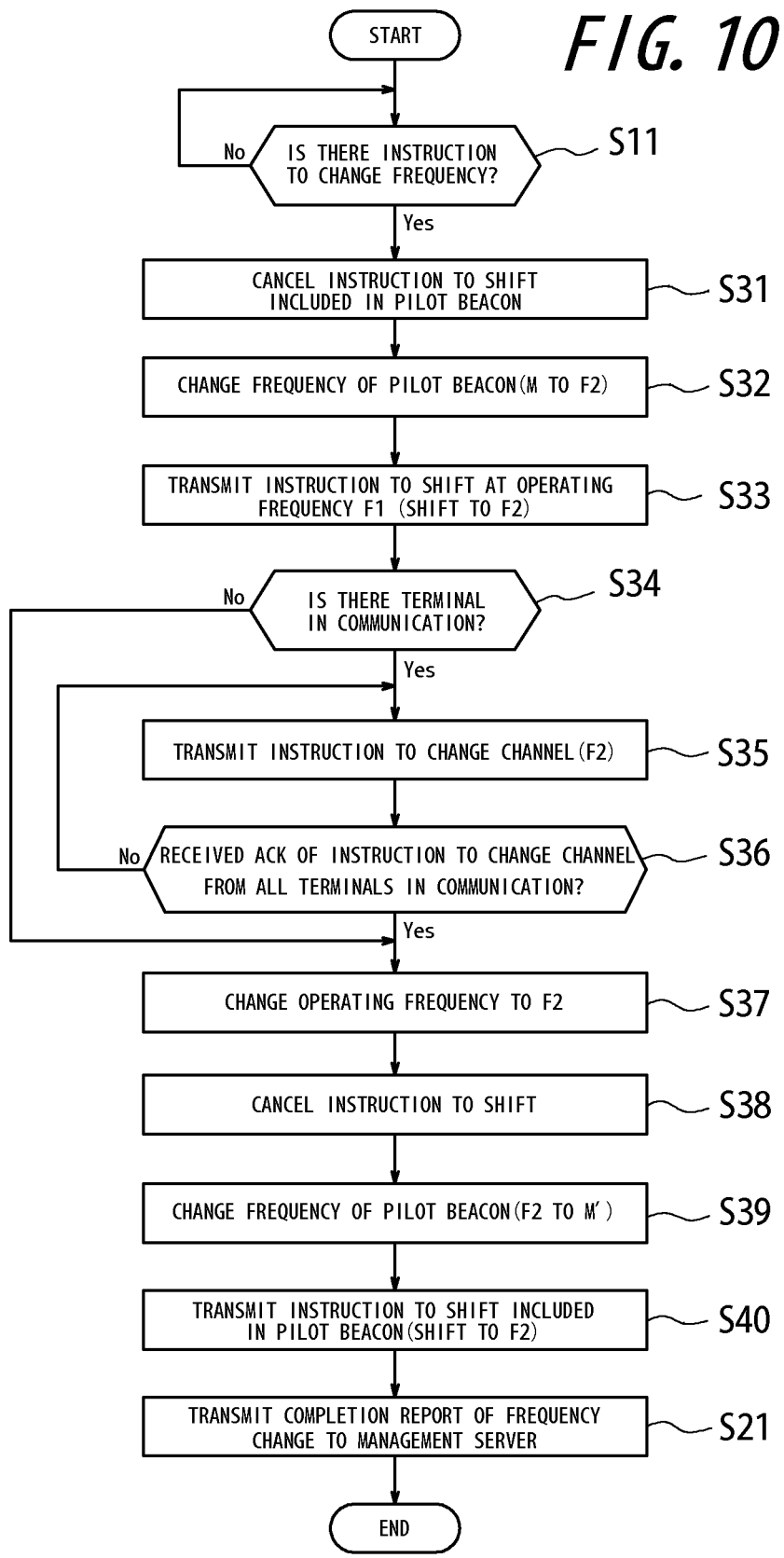
FIG. 10 is a flowchart illustrating an operation of the femtocell according to the second embodiment of the present invention.
Figure 11:
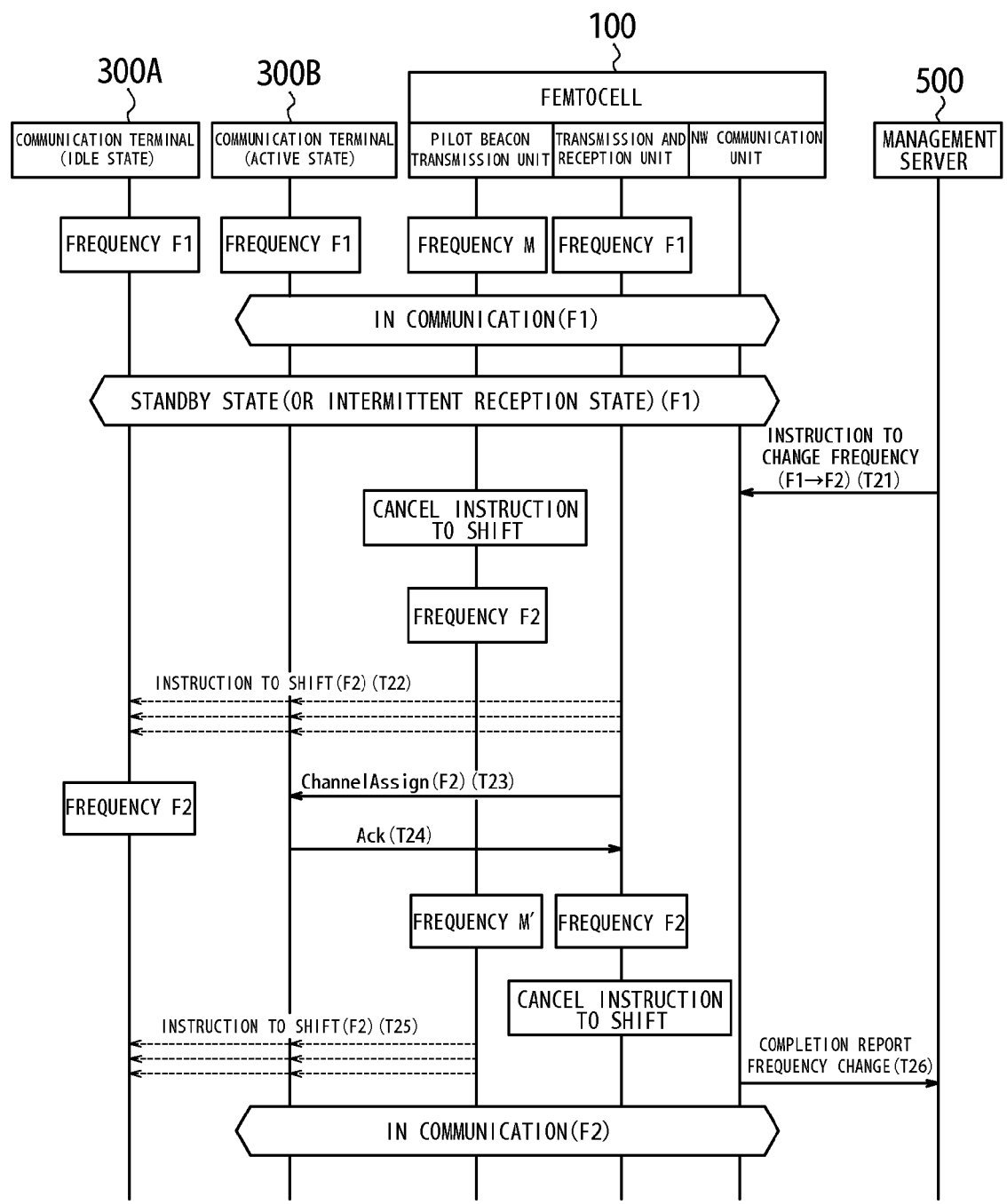
FIG. 11 is a sequence diagram of the communication terminal, the femtocell and the management server according to the second embodiment of the present invention.

Next, change of the operating frequency of the femtocell 100 according to the second embodiment of the present invention will be described with reference to a flowchart and a sequence diagram. FIG. 10 is a flowchart illustrating an operation of the femtocell 100 and FIG. 11 is a sequence diagram of the communication terminals 300A, 300B, the femtocell 100 and the management server 500.

The flowchart shown in FIG. 10 starts in a state that the femtocell 100 is connected to the network 400 and communicating (in the Active state (in voice call or data communication) with the communication terminal 300 at the operating frequency F1, as well as transmitting the pilot beacon at the operating frequency M.

First, the control unit 101 controls the interference determination unit 107 to determine whether the radio waves are interfered. The interference determination unit 107 reports a result of such determination to the management server 500 via the NW communication unit 106. The management server 500 determines to change the operating frequency based on the report and other reports from nearby femtocells and informs the femtocell 100 accordingly. The femtocell 100 determines whether there is the instruction to change the operating frequency of the transmission and reception unit 102 from the operating frequency F1 to the operating frequency F2 (step S11).

If there is the instruction to change the operating frequency, the control unit 101 cancels the instruction included in the pilot beacon to shift (redirect) to the operating frequency F1 of the femtocell 100 (step S31). That is, the control unit 101 controls to exclude the instruction to shift to the operating frequency F1 from the pilot beacon.

The control unit 101 changes the frequency of the pilot beacon transmitted from the pilot beacon transmission unit 104 from the operating frequency M of the macrocell to the operating frequency F2 and controls the pilot beacon transmission unit 104 to transmit the pilot beacon at the operating frequency F2 (step S32).

The control unit 101 controls the transmission and reception unit 102 to transmit the radio signal including the instruction to shift (redirect) to the operating frequency F2 of the femtocell 100A at the operating frequency F1 (step S33).

The control unit 101 determines whether there is the communication terminal 300 in communication with the femtocell itself (step S34).

If it is determined that there is the communication terminal 300 in communication with the femtocell itself, the control unit 101 controls the transmission and reception unit 102 to transmit the channel (frequency) change instruction (ChannelAssign) (step S35). The channel change instruction includes the instruction to change to the communication channel at the operating frequency F2. Upon reception of the acknowledgment (Ack) of the channel change instruction from the communication terminal 300 in communication in response to the channel change instruction, the operation shifts to step S36.

If the acknowledgment of the channel change instruction is not received from the communication terminal 300 in communication, the operation returns to step S13 such that the control unit 101 controls the transmission and reception unit 102 to continue transmission of the channel change instruction. When receiving the acknowledgments from all terminals in communication (Yes of step S36), the operation shifts to step S37.

Next, based on the instruction to change the frequency at step S11, the control unit 101 changes the operating frequency F1 of the transmission and reception unit 102 to the operating frequency F2, and controls the transmission and reception unit 102 to start transmission and reception of the signals at the operating frequency F2 (step S37). Then, the control unit 101 cancels the instruction to shift (redirect) transmitted at step S33 (step S38). That is, the control unit 101 stops transmitting the radio signals including the instruction to shift (redirect) to the operating frequency F2 transmitted at the operating frequency F1 by the transmission and reception unit 102.

Next, the control unit 101 changes the frequency of the pilot beacon transmitted from the pilot beacon transmission unit 104 from the operating frequency F2 of the macrocell to the operating frequency M' and controls the pilot beacon transmission unit 104 to transmit the pilot beacon at the operating frequency M' (step S39).

Then, the control unit 101 changes setting of the instruction to shift (redirect) included in the pilot beacon transmitted from the pilot beacon transmission unit 104 from the operating frequency F1 to the operating frequency F2 (step S40). This allows the communication terminal 300 receiving the pilot beacon to shift (redirect) to the operating frequency F2 and detect (capture) it.

After changing the instruction, the control unit 101 transmits the completion report of operating frequency change, which is the information that change of the operating frequency of the femtocell 100 is completed, to the management server 500 via the NW communication unit 106 (step S21), and thus ends the operation.

Next, change of the operating frequency of the femtocell 100 will be described with reference to a sequence diagram. FIG. 11 is the sequence diagram of the communication terminals 300A, 300B, the femtocell 100 and the management server 500. The communication terminals 300A, 300B are connected to (having registered their positions with) the femtocell 100 at the operating frequency F1. While the communication terminal 300A is in the standby state or in the intermittent reception state (Idle state), the communication terminal 300B is in communication (in the Active state (in voice call or data communication)). The femtocell 100 transmits the pilot beacon, which includes the instruction to shift (redirect) to the operating frequency F1, at the operating frequency M of the macrocell 200.

Upon reception of the instruction to change its operating frequency from the operating frequency F1 to the operating frequency F2 from the management server 500 (step T21), the control unit 101 of the femtocell 100 cancels the instruction to shift (redirect) to the operating frequency F1 included in the pilot beacon.

Next, the control unit 101 changes the frequency of the pilot beacon transmitted from the pilot beacon transmission unit 104 from the operating frequency M of the macrocell to the operating frequency F2 and controls the pilot beacon transmission unit 104 to transmit the pilot beacon at the operating frequency F2.

Subsequently, the control unit 101 controls the transmission and reception unit 102 to transmit the instruction to shift (redirect) to the operating frequency F2 of the femtocell 100A at the operating frequency F1 of the transmission and reception unit 102 (step T22).

Then, the control unit 101 determines whether there is the communication terminal 300 in communication with the femtocell itself. If it is determined that there is the communication terminal 300 in communication with the femtocell itself, the control unit 101 controls the transmission and reception unit 102 to transmit the channel (frequency) change instruction (ChannelAssign) (step T23). The channel change instruction includes the instruction to change to the communication channel at the operating frequency F2.

Upon reception of the Acknowledgment (Ack) of the channel change instruction from the communication terminal 300B in communication (step T24) after transmission of the channel change instruction, the control unit 101 changes the operating frequency F1 of the transmission and reception unit 102 to the operating frequency F2. The transmission and reception unit 102 starts transmission and reception of the signals at the operating frequency F2, and the control unit 101 cancels the instruction to shift (redirect). In addition, the control unit 101 changes the frequency of the pilot beacon transmitted from the pilot beacon transmission unit 104 from the operating frequency F2 to the operating frequency M' and controls the pilot beacon transmission unit 104 to transmit the pilot beacon at the operating frequency M'. The control unit 101 changes setting of the instruction to shift (redirect) included in the pilot beacon transmitted from the pilot beacon transmission unit 104 from the operating frequency F1 to the operating frequency F2.

It thereby allows the communication terminal 300 having received the pilot beacon to shift (redirect) to the operating frequency F2 and detect (capture) it. After change of the instruction, the control unit 101 transmits the completion report of operating frequency change, which is the information that change of the operating frequency of the femtocell 100 is completed, to the management server 500 via the NW communication unit 106 (step T26), and thus ends the operation.

According to the present embodiment, as described above, it is possible to change the operating frequency of the femtocell while maintaining the communication terminal having registered its position with the femtocell, preventing the communication terminal from registering its position with the macrocell.

According to the present embodiment, unlike conventional methods to change the operating frequencies of the femtocells, the femtocell prevents the communication terminal having registered its position therewith from shifting to the macrocell. It thus eliminates the need for the communication terminal to search a base station necessary for connection to the macrocell and register its position, which allows the communication terminal to save power consumption.

For example, when the femtocell is used in an office, a few tens or more of communication terminals may register their positions with the femtocell. According to the conventional methods to change the operating frequencies of the femtocells, when the femtocell changes the operating frequency under such a condition, it causes not only deterioration in a communication quality but temporal disconnection due to increase in interference at reception because of concurrent access by the communication terminals having registered their positions with the femtocell. According to the present embodiment, however, it is possible for the femtocell to change the operating frequency thereof while keeping the communication terminal (mobile station) having registered its position with the femtocell itself, preventing the communication terminal from registering its position with another base station. Having no concurrent access from the communication terminals having registered their positions with the femtocell, the macrocell will not cause deterioration in the communication quality and the like.

Although the communication terminal 300A in the Idle state shifts to the operating frequency after changed following the shift (redirect) instruction in the above embodiments, the communication terminal 300B in the Active state can make the same movement as well. In this case, the communication terminal 300B in the Active state can change the operating frequency without waiting for the channel change instruction (ChannelAssign).

In addition, although the operating frequencies F1, F2 used by the transmission unit 102 are in different band classes in the above embodiments, the present invention is not limited thereto but the operating frequencies F1, F2 may be in the same band class. Moreover, although the frequency of the pilot beacon corresponds to the control channel in the band class in the above embodiments, the present invention is not limited thereto but the frequency may be any which can be detected by the communication terminal in the standby state.

Further, the operating frequency in the above embodiments may represent a frequency band. In this case, changing the frequency of the pilot beacon to the operating frequency M means, for example, changing the frequency of the pilot beacon to a frequency corresponding to the control channel in the frequency band having the frequency M as a center frequency.

Although the present invention is described based on figures and the embodiments, it is to be understood that those skilled in the art may easily vary or alter in a multiple manner based on disclosure of the present invention. Accordingly, such variation and modification are included in a scope of the present invention. For example, functions included in each unit or step can be rearranged avoiding a logical inconsistency such that a plurality of components or steps are combined, or divided. In the above embodiments, for example, the transmission and reception unit 102 and the pilot beacon transmission unit 104 are in different functional blocks. However, it is possible to substantialize their functions with individual hardware, or hardware configured to function separately through software processing.

REFERENCE SIGNS LIST 100, 100A-C femtocell
101 control unit
102 transmission and reception unit
103 transmission and reception antenna
104 pilot beacon transmission unit
105 pilot beacon transmission antenna
106 NW communication unit
107 interference determination unit 110A-C, 120A-C area
200 macrocell
210 area
300, 300A, 300B communication terminal
400 network
500 management server

The invention claimed is:

1. A base station comprising:
   a transmission and reception unit configured to transmit and receive a radio signal at an operating frequency for communication with a communication terminal connected to the base station itself;
   a pilot beacon transmission unit configured to transmit a pilot beacon including an instruction for the communication terminal to detect the operating frequency of the base station itself; and
   a control unit, wherein with a change of the operating frequency of the transmission and reception unit, the control unit is configured to control the pilot beacon transmission unit by changing a frequency of the pilot beacon transmitted by the pilot beacon transmission unit to prevent the communication terminal connected to the base station itself from connecting to another base station.

2. The base station according to claim 1, wherein the control unit, with a change of the operating frequency of the transmission and reception unit, controls the pilot beacon transmission unit to change a frequency of the pilot beacon to the operating frequency of the transmission and reception unit before changed.

3. The base station according to claim 2, wherein the control unit, with a change of the operating frequency of the transmission and reception unit and there is the communication terminal in communication at the operating frequency of the transmission and reception unit, controls the transmission and reception unit to change the operating frequency of the transmission and reception unit after changing the operating frequency of the communication terminal in communication.

4. The base station according to claim 2, wherein the control unit, after a predetermined period after changing the frequency of the pilot beacon, controls the pilot beacon transmission unit to change the frequency of the pilot beacon to an operating frequency used by another base station.

5. The base station according to claim 1, wherein the control unit, with a change of the operating frequency of the transmission and reception unit, controls the pilot beacon transmission unit to change the frequency of the pilot beacon to the operating frequency changed and controls the transmission and reception unit, without including the instruction in the pilot beacon, to transmit the radio signal including the instruction at the operating frequency before changed.

6. The base station according to claim 5, wherein the control unit, with a change of the operating frequency of the transmission and reception unit and there is the communication terminal in communication at the operating frequency of the transmission and reception unit, controls the transmission and reception unit to change the operating frequency of the transmission and reception unit after making the communication terminal in communication change its operating frequency.

7. The base station according to claim 5, wherein the control unit, when the operating frequency of the transmission and reception unit is changed, controls the pilot beacon transmission unit to change the frequency of the pilot beacon to the operating frequency used by another base station and transmit the pilot beacon including the instruction.

8. A method of controlling a base station having a transmission and reception unit configured to transmit and receive a radio signal at an operating frequency for communication with a communication terminal and a pilot beacon transmission unit configured to transmit a pilot beacon including an instruction for the communication terminal to detect the operating frequency of the base station itself, comprising:
   with a change of the operating frequency of the transmission and reception unit,
   changing a frequency of the pilot beacon transmitted from the pilot beacon transmission unit, in order to prevent the communication terminal connected to the base station itself from connecting to another base station; and
   controlling the pilot beacon transmission unit to transmit the pilot beacon at the frequency changed.

* * * * *